US007990821B2

United States Patent
Nakamura

(10) Patent No.: US 7,990,821 B2
(45) Date of Patent: Aug. 2, 2011

(54) OPTICAL DISK PLAYBACK DEVICE

(75) Inventor: Yoshitaka Nakamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 371 days.

(21) Appl. No.: 12/301,482

(22) PCT Filed: Apr. 11, 2007

(86) PCT No.: PCT/JP2007/058001
§ 371 (c)(1),
(2), (4) Date: Nov. 19, 2008

(87) PCT Pub. No.: WO2008/018206
PCT Pub. Date: Feb. 14, 2008

(65) Prior Publication Data
US 2009/0201778 A1    Aug. 13, 2009

(30) Foreign Application Priority Data

Aug. 9, 2006    (JP) .................................. 2006-217113

(51) Int. Cl.
*G11B 20/00* (2006.01)
(52) U.S. Cl. ................. 369/47.15; 369/47.4; 369/47.41; 369/44.28
(58) Field of Classification Search ............... 369/47.15, 369/47.4, 47.41
See application file for complete search history.

(56) References Cited

U.S. PATENT DOCUMENTS

| | | | |
|---|---|---|---|
| 4,939,712 A * | 7/1990 | Abe et al. .................... | 369/30.16 |
| 5,583,835 A | 12/1996 | Shimosaka | |
| 5,616,390 A * | 4/1997 | Miyagawa et al. .......... | 428/64.1 |
| 2004/0190399 A1 * | 9/2004 | Ceshkovsky ............... | 369/44.11 |
| 2006/0041796 A1 * | 2/2006 | Kim .............................. | 714/700 |
| 2007/0014208 A1 * | 1/2007 | Auh ........................... | 369/44.28 |

FOREIGN PATENT DOCUMENTS

| JP | 3-12596 U | 2/1991 |
|---|---|---|
| JP | 3012596 U | 2/1991 |
| JP | 5-60191 B2 | 9/1993 |
| JP | 5060191 B2 | 9/1993 |
| JP | 8-161868 A | 6/1996 |
| JP | 2002-237032 A | 8/2002 |
| JP | 2002-237172 A | 8/2002 |
| JP | 2003-272348 A | 9/2003 |
| JP | 2004-39008 A | 2/2004 |

* cited by examiner

*Primary Examiner* — Lixi Chow
(74) *Attorney, Agent, or Firm* — Birch, Stewart, Kolasch & Birch, LLP.

(57) ABSTRACT

An optical disk playback device includes a control means (an LSI 5 for system control) for performing a track search according to contents information, comparing a current track start point position at the time after performing the track search with a target track start point position, when the comparison result shows that they differ from each other, setting up a new target track start point position by performing a predetermined arithmetic operation, then performing a track search again, and, when a new current track start point position at the time after performing the track search again matches the set-up new target track start point position, starting a playback from the new current track start point position.

6 Claims, 2 Drawing Sheets ively-acquired program area. In this case, there arises a problem that when performing a search for a track start point on the basis of the contents information of the TOC, a track position which is different from the actual one is searched for and, for example, a playback is started from some midpoint of a musical piece or a flickering screen display is produced.

OPTICAL DISK PLAYBACK DEVICE

FIELD OF THE INVENTION

The present invention relates to an optical disk playback device which performs movement control of an optical pickup by using contents information recorded in a TOC (Table Of Contents) of, for example, a compact disk or the like.

BACKGROUND OF THE INVENTION

An optical disk playback device for playing back an optical disk, such as a CD-ROM, reads contents information in a program area recorded in a TOC area on the optical disk, and reads information about music, an image, or the like recorded in the program area on the basis of the contents information to play back the information. Such an optical disk playback device performs the same operation on a write-once type optical disk, such as a CD-R, and a re-recordable optical disk, such as a CD-RW.

By the way, a problem occurring in a mastering process for commercial disks, a problem occurring when the user writes data into a writable type disk, an error occurring at a time of TOC reading, or the like may cause a difference between the contents information ready by a drive (a control microcomputer) and the address of the actually-acquired program area. In this case, there arises a problem that when performing a search for a track start point on the basis of the contents information of the TOC, a track position which is different from the actual one is searched for and, for example, a playback is started from some midpoint of a musical piece or a flickering screen display is produced.

There is known a technology of, in order to solve this problem, judging whether playback equipment has succeeded or failed in reading out the contents information of an optical disk on the basis of the length of time required to read out the contents information (for example, refer to patent reference 1).

[Patent reference 1] JP,2003-272348,A

According to the technology disclosed by the above-mentioned patent reference 1, because correct contents information can be acquired from the TOC of an optical disk before the playback equipment starts a playback of data, the playback equipment can be prevented from being unable to play back the data due to incorrect contents information.

However, because the playback equipment repeats a process of acquiring the contents information until it can acquire the correct contents information from the optical disk, even if the reliability of the data playback of the optical disk can be improved, there may be a case in which the playback equipment falls into a loop and cannot terminate normally depending on the cause of an occurring error, and therefore cannot play back the data.

The present invention is made in order to solve the above-mentioned problems, and it is therefore an object of the present invention to provide an optical disk playback device which, when receiving a search request, performs a track search according to contents information, compares a current track start point position at a time after performing the track search with a target track start point position, and, when the comparison result shows that they differ from each other, sets up a new target track start point position by performing a predetermined arithmetic operation, and which, as a result, can find out a correct track start point position promptly and can start a playback of data.

DISCLOSURE OF THE INVENTION

In accordance with the present invention, there is provided an optical disk playback device including: a disk control means for performing a track search according to contents information; and a main control means for comparing a current track start point position at a time after the track search is performed with a target track start point position, and for, when a result of the comparison shows that they differ from each other, setting up a new target track start point position by performing predetermined arithmetic processing, and controlling the disk control means.

In accordance with the present invention, there is provided an optical disk playback device including: an optical pickup means for reading information recorded in an optical disk and for outputting a signal according to the information; a signal processing means for decoding the signal outputted by the optical pickup means to output the decoded signal to a playback system, and for extracting a subcode from the signal to output time information; a control means for analyzing contents information recorded in the optical disk from the subcode to perform a track search, for comparing a current track start point position at a time after performing the track search with a target track start point position, for, when a result of the comparison shows that they differ from each other, setting up a new target track start point position by performing a predetermined arithmetic operation, and then performing a track search again, and, when a new current track start point position at a time after performing the track search again matches the set-up new target track start point position, starting a playback from the new current track start point position; and a servo control means for carrying out movement control of the optical pickup means on a basis of the new current track start point position.

In accordance with the present invention, when receiving a search request, the optical disk playback device performs a track search according to the contents information, compares the current track start point position at the time after performing the track search with the target track start point position, and, when the comparison result shows that they differ from each other, sets up the new target track start point position by performing a predetermined arithmetic operation. Therefore, the optical disk playback device can find out a correct track start point position promptly, and can start a playback.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
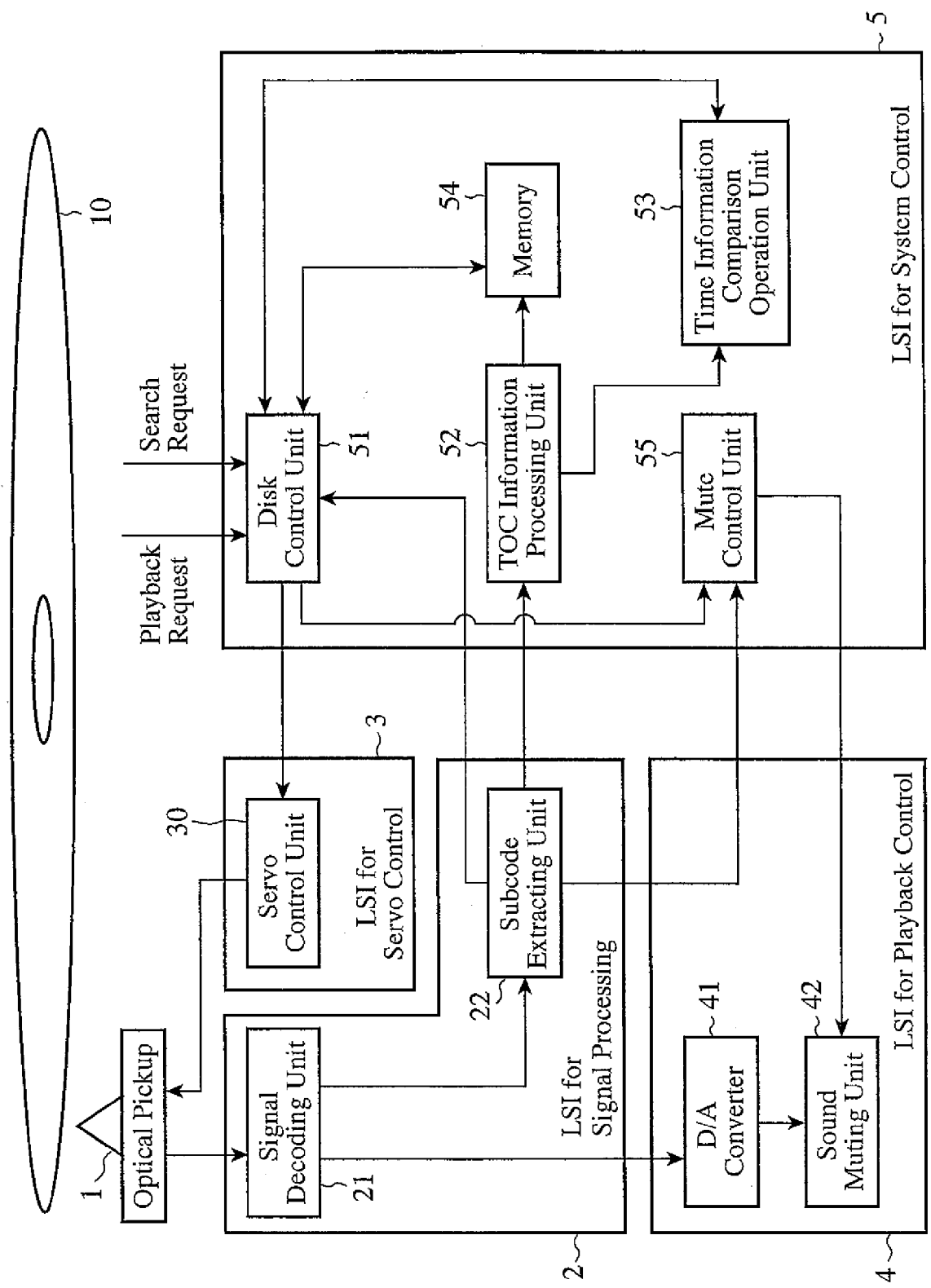
FIG. 1 is a block diagram showing the internal structure of an optical disk playback device in accordance with Embodiment 1 of the present invention.

FIG. 1 is a block diagram showing the internal structure of an optical disk playback device in accordance with Embodiment 1 of the present invention.

In this embodiment, the optical disk playback device is comprised of an optical pickup 1, an LSI 2 for signal processing, an LSI 3 for servo control, an LSI 4 for playback control, and an LSI 5 for system control.

The optical pickup 1 operates as an optical pickup means for reading information recorded in an optical disk 10, and outputting a signal (an RF signal) according to this information to the LSI 2 for signal processing. The LSI 2 for signal processing operates as a signal processing means for decoding the RF signal outputted from the optical pickup 1 and then outputting the decoded RF signal to the LSI 4 for playback control, and for extracting a subcode from the RF signal and then outputting time information to the LSI 5 for system control.

To this end, the LSI 2 for signal processing is comprised of a signal decoding unit 21 and a subcode extracting unit 22.

The LSI 3 for servo control operates as a servo control means for performing movement control of the optical pickup 2 on the basis of corrected track start point position information. Concretely, the LSI for servo control includes a servo control unit 30 for performing control for tracking and focusing.

The LSI 4 for playback control operates as a playback system for converting the RF signal decoded by the LSI 2 for signal processing into a digital signal, and for carrying out a medium playback (e.g., an audio playback), and includes a D/A converter 41 for converting the digital signal into an analog signal, and a sound muting unit 42 for performing a mute (silence) process on the sound signal.

The LSI 5 for system control operates as a control means for performing a track search according to contents information recorded in the optical disk 10, comparing a current track start point position at the time after performing the track search with a target track start point position, when the comparison result shows that they differ from each other, setting up a new target track start point position by performing a predetermined arithmetic operation, then performing a track search again, and, when a new current track start point position at a time after performing the track search again matches the set-up new target track start point position, starting a playback from the new current track start point position.

To this end, the LSI 5 for system control is comprised of a disk control unit 51 which operates as a disk control means for carrying out a track search according to the contents information, a table-of-contents (TOC) information processing unit 52, a time information comparison operation unit 53, and a memory 54, which operate as a main control means for comparing the current track start point position at the time after performing the track search with the target track start point position, when the comparison result shows that they differ from each other, setting up the new target track start point position by performing the predetermined arithmetic processing and controlling the disk control unit 51, and a mute control unit 55.

The disk control unit 51 receives a track search request from outside the device, acquires the time information from the subcode extracting unit 22 of the LSI 2 for signal processing to acquire current track address information, and, when reaching the target track, detects its track start point address to set up this track as the target track and then performs movement control of the optical pickup 1 via the servo control unit 30. It is assumed that the track search request is generated when a user manipulates a switch not shown in the figure.

The TOC information processing unit 52 analyzes the contents information recorded in the optical disk 10 from the subcode outputted from the subcode extracting unit 22 of the LSI 2 for signal processing and then holds a track start point address and so on in the memory 54 while controlling the time information comparison operation unit 53 on the basis of the information held in the memory 54.

When the track start point address cannot be detected, under the control of the disk control unit 51 and the TOC information processing unit 52, the time information comparison operation unit 53 compares the current track address with the target track address, and, when judging that the current track address is larger than the above-mentioned target track address, calculates the current track start point address by acquiring the elapsed time information of the current track address, and sets up, as a search target address, an address which the time information comparison operation unit acquires by subtracting a predetermined time from the above-mentioned current track start point address.

When judging that the current track address is smaller than the target track address, the time information comparison operation unit 53 sets up, as the search target address, an address which the time information comparison operation unit acquires by adding a predetermined time to the current search target address. Furthermore, when judging that the current track address is the same as the target track address, the time information comparison operation unit calculates an actual track start point address by acquiring the elapsed time information of the current track address and then subtracting the elapsed time information from the disk playback elapsed time information, and holds them in the memory 54.

When the track start point address is detected under the control of the disk control unit 51, the mute control unit 55 releases mute control which has been made on the audio output and controls the playback system (the sound muting unit 42).

Figure 2:
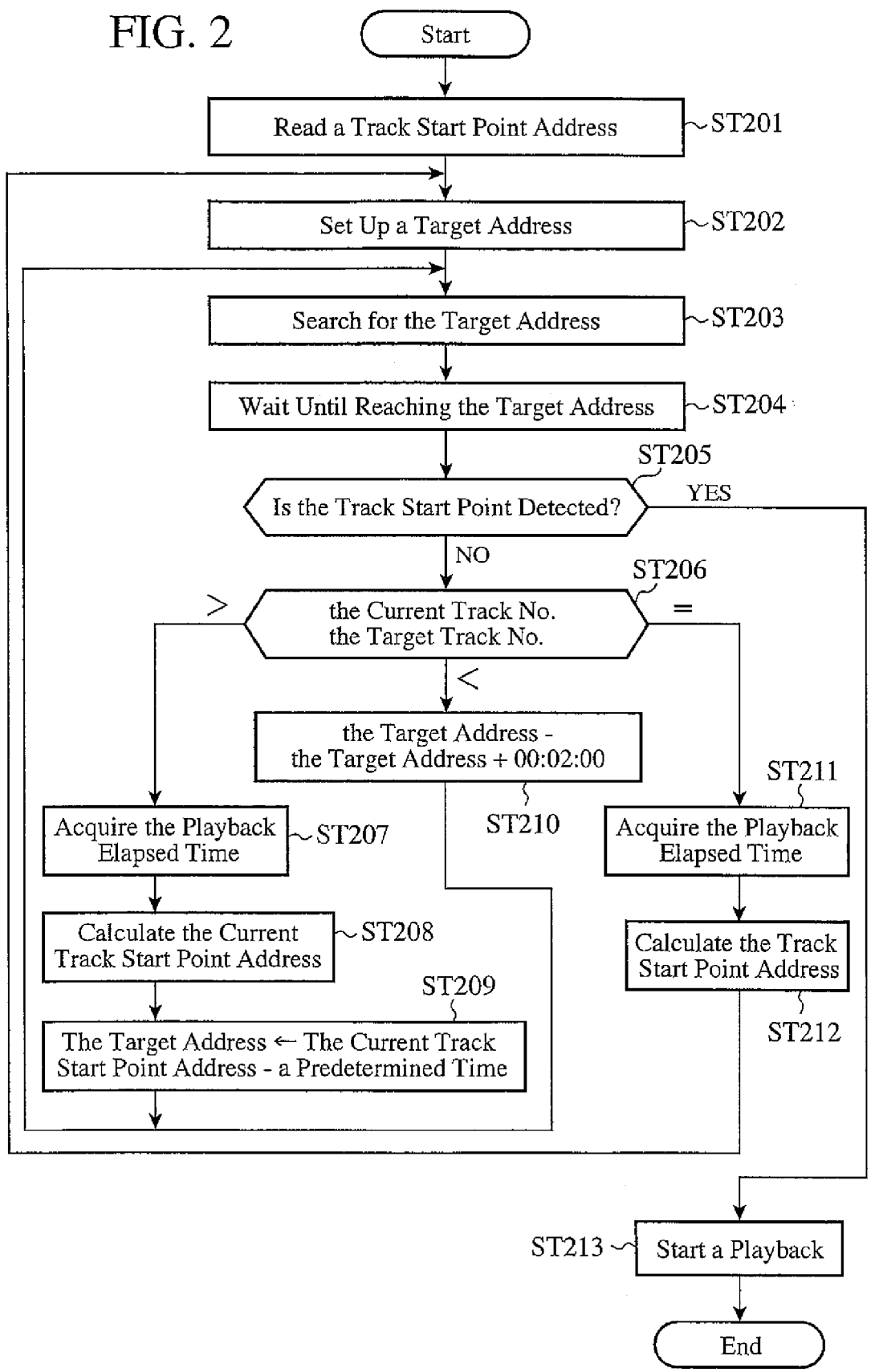
FIG. 2 is a flow chart which is referred to in order to explain the operation of the optical disk playback device in accordance with Embodiment 1 of the present invention.

FIG. 2 is a flow chart which is referred to in order to explain the operation of the optical disk playback device in accordance with Embodiment 1 of the present invention.

Hereafter, the operation of the optical disk playback device in accordance with Embodiment 1 shown in FIG. 1 will be explained in detail with reference to the flow chart of FIG. 2.

First, it is assumed that a user manipulates a switch to input a track search request to the device from outside the device. The LSI 5 for system control receives this track search request with the disk control unit 51, and performs movement control of the optical pickup 1 in such a way that the optical pickup moves to a desired position by controlling the LSI 3 for servo control (the servo control unit 30).

The disk control unit 51, in response to the above-mentioned track search request, reads the track start point address currently held by the memory 54 first (step ST201), and, after setting up, as the search target address, the track start point address (step ST202), performs a search for the target address (step ST203). A subcode including time information from the LSI 2 for signal processing (the subcode extracting unit 22) is furnished to the TOC information processing unit 52, and the TOC information processing unit 52 holds a track start point address which the TOC information processing unit acquires by analyzing the subcode in the memory unit 54, and also furnishes the track start point address to the time information comparison operation unit 53.

The disk control unit 51 waits until reaching the target address (a target address waiting process: step ST204), and performs judgment of whether or not the track start point position can be detected (step ST205).

When the disk control unit 51 cannot detect the track start point position (if "NO" in step ST205), the disk control unit 51 starts the time information comparison operation unit 53, and the time information comparison operation unit 53 then compares the current track position with the target track position (step ST206).

When, as the result of the above-mentioned comparison, judging that the current track position (number) is the same as the target track position (number) (if "=" in step ST206, the disk control unit 51 acquires the track playback elapsed time information at the current position from the subcode extracting unit 22, and delivers this track playback elapsed time information to the time information comparison operation unit 53 (step ST211).

The time information comparison operation unit 53 calculates the actual track start point address by subtracting the above-mentioned track playback elapsed time information which the time information comparison operation unit has acquired from the absolute time information (the disk playback elapsed time), and delivers the actual track start point address to the disk control unit 51 (step ST212), and, as a result, the disk control unit 51 returns to the process of step ST202.

More specifically, when the current track position is at a midpoint to the target track position (if "=" in step ST206), the time information comparison operation unit 53 refers to both the absolute time information on the disk at the current track position and the elapsed time information on the track so as to calculate a target track position which makes the elapsed time information on the current track become zero (00 minutes: 00 seconds: 00 frames in an MSF (Music Studio File) format), and delivers the target track position to the disk control unit 51.

In contrast, when, as the result of the above-mentioned comparison, judging that the current track position (number) is located further away from the target track position (number) (if ">" in step ST206), the disk control unit 51 acquires the track playback elapsed time information at the current position from the subcode extracting unit 22 and delivers the track playback elapsed time information to the time information comparison operation unit 53 (step ST207).

As a result, after calculating the current track start point address (step ST208), the time information comparison operation unit 53 delivers an address (a track immediately preceding the current track) which the time information comparison operation unit acquires by subtracting a predetermined time from the current track start point address to the disk control unit 51, and the disk control unit 51 sets up, as the search target address, this address and returns to the process of step ST203 (step ST209).

More specifically, when the current track position is located behind the target track position (if ">" in step ST206), the time information arithmetic operation unit 53 calculates a temporary current track start point position from both the absolute time information at the current track position and the elapsed time information on the current track, and further repeats a process of calculating position information about a position at which to enter the track located immediately before the temporary current track start point position, and setting up a temporary target track position (a loop of steps ST207 to ST209 and steps ST203 to ST206).

When the temporary current track start point position then enters the temporary target track (if "=" in step ST206), the time information comparison operation unit refers to both the absolute time information on the disk at the current track position and the elapsed time information on the track so as to calculate a target track position which makes the elapsed time information on the current track become zero.

In contrast, when judging that the current track number is smaller than the target track number (if "<" in step ST206), the disk control unit 51 acquires data which are acquired by adding a predetermined time (e.g., 2 ms) to the current search target address via the time information comparison operation unit 53, resets the data to be the search target address, and returns to the process of step ST202 (step ST210).

More specifically, when the current track position is located before the target track position (if "<" in step ST206), the time information comparison operation unit 53 waits for the track start during a predetermined time period and then repeats a track jump of a predetermined amount until finding the target track position (a loop of steps ST210, and ST202 to ST206), and, when entering the target track (if "=" in step ST206), refers to both the absolute time information on the optical disk 10 at the current track position and the elapsed time information on the track so as to calculate a target track position which makes the elapsed time information on the current track become zero.

The disk control unit 51 can finally detect the track start point position through the above-mentioned processing (if "Yes" in step ST205), and, at that time, starts the mute control unit 55, so that the mute control unit 55 controls the sound muting unit 42 of the LSI 4 for playback control so as to release mute control which has been made on the audio output, thereby starting a playback, and ends the search processing (step ST213).

As previously explained, in accordance with Embodiment 1 of the present invention, when receiving a search request, the optical disk playback device performs a track search according to the contents information, compares the current track start point position at the time after performing the track search with the target track start point position, and, when the comparison result shows that they differ from each other, sets up a new target track start point position by performing a predetermined arithmetic operation. Therefore, the optical disk playback device can find out a correct track start point position promptly, and can start a playback.

In accordance with above-mentioned Embodiment 1 of the invention, although the disk control unit 51 sets up the target address on the basis of the track starting address currently held in the memory 54, in a case in which the optical disk playback device has performed a search once and acquired error information (the difference between the target address and the current position address at the time when performing the search), the optical disk playback device can hold this error information in the memory 54, calculate the right track starting address from the track starting address and its error information, and search by setting up the search target address on the basis of this information in advance of the above-mentioned target address selection.

Furthermore, the disk control unit 51 can update the contents information by using the above-mentioned error information, and can perform a track search the next and subsequent times on the basis of the updated contents information. According to this structure, the optical disk playback device can perform a search for the track start more promptly.

The LSI 5 for system control shown in FIG. 1 consists of, for example, a microcomputer, and serially reads a program recorded in an internal memory, and executes the program to control the peripheral LSIs, so as to perform the functions of the control means for performing a track search according to the contents information, comparing the current track start point position at the time after performing the track search with the target track start point position, when the comparison result shows that they differ from each other, setting up the new target track start point position by performing a predetermined arithmetic operation, then performing a track search again, and, when the new current track start point position at the time after performing the track search again matches the set-up new target track start point position, starting a playback from the new current track start point position. The peripheral LSIs mentioned here refer to the LSI 2 for signal processing, the LSI 3 for servo control, and the LSI 4 for playback control.

INDUSTRIAL APPLICABILITY

As mentioned above, the optical disk playback device in accordance with the present invention can find out a correct track start point position promptly and start a playback by comparing the target track start point position based on the contents information with the current track start point position acquired through an actual track search, and then setting up a new target track start point position. Therefore, the optical disk playback device in accordance with the present invention is suitable for use in playback of an optical disk which includes contents information in its TOC area, such as a CD-ROM, a CD-R, or a CD-RW.

The invention claimed is:

1. An optical disk playback device characterized in comprising:
   a disk control means for performing a track search according to contents information; and
   a main control means for comparing a current track position at a time after said track search is performed with a target track position, for, when a result of the comparison shows that said current track position is larger than the target track position, calculating said current track start point position by acquiring an elapsed time information of said current track position and for setting up a position acquired by subtracting a predetermined time from said current track start point position as said target track position, and for, when a result of the comparison shows that said current track position is smaller than said target track position, setting up a position acquired by adding a predetermined time to current target track position as said target track position and controlling said disk control means.

2. The optical disk playback device according to claim 1, characterized in that when the result of said comparison shows that said current track position is at a midpoint to said target track position, said main control means refers to both absolute time information on the disk at said current track position and elapsed time information at said current track position so as to calculate a target track position which makes the elapsed time information on said current track position become zero.

3. The optical disk playback device according to claim 1, characterized in that when the result of said comparison shows that said current track position is located behind said target track position, said main control means calculates a temporary current track start point position from absolute time information at said current track position and elapsed time information on said current track position, further repeats a process of calculating information about a position at which to enter a track located immediately before said temporary current track start point position, and setting up a temporary target track position, and, when said current track start point position enters said temporary target track position, refers to both absolute time information on the disk at said current track position and elapsed time information on said current track position so as to calculate a target track position which makes the elapsed time information on said current track position become zero.

4. The optical disk playback device according to claim 1, characterized in that when the result of said comparison shows that said current track position is located before said target track position, said main control means waits for a track start during a predetermined time period, repeats a track jump of a predetermined amount until finding said target track position, and, when entering said target track position, refers to both absolute time information on the disk at said current track position and elapsed time information on said current track position so as to calculate a target track position which makes information about an elapsed time on said current track position become zero.

5. The optical disk playback device according to claim 1, characterized in that said main control means holds error information which said main control means generates by carrying out a comparison between information about a track start point position which is detected when said track search is performed, and information about a track start point position which is acquired with reference to the contents information recorded in said optical disk, and, when a next track search is performed, corrects said track start point position information on a basis of said error information held thereby.

6. The optical disk playback device according to claim 5, characterized in that said main control means updates said contents information by using said error information, and performs a next track search and subsequent track searches on a basis of said updated contents information.

* * * * *